March 11, 1930.  L. J. STERN  1,750,334
LIQUID CONTAINER
Filed March 9, 1929  2 Sheets-Sheet 1

March 11, 1930.　　　　L. J. STERN　　　　1,750,334
LIQUID CONTAINER
Filed March 9, 1929　　　2 Sheets-Sheet 2
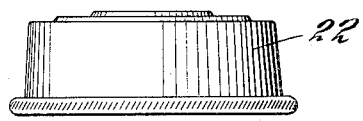
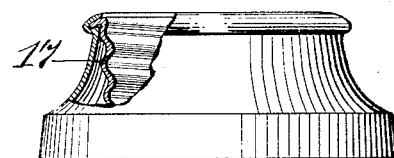
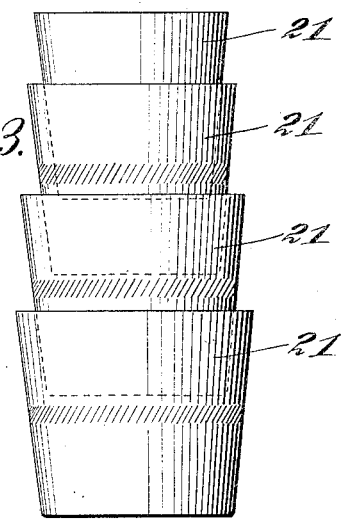
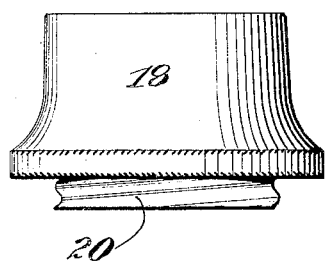
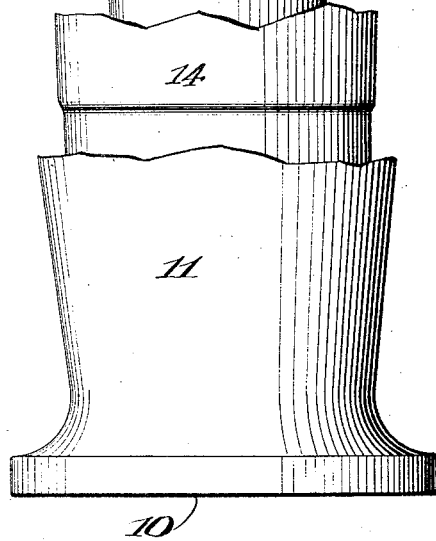

Patented Mar. 11, 1930

1,750,334

UNITED STATES PATENT OFFICE

LOUIS J. STERN, OF NEW YORK, N. Y.

LIQUID CONTAINER

Application filed March 9, 1929. Serial No. 345,767.

My invention relates to beverage containers and refers particularly to containers so constructed that the heating, or cooling, materials are retained from contact with the beverage and which contain a plurality of drinking cups.

Among the advantages possessed by the preferred form of my device are stepped sides to the container indicating the proper proportions of liquids required for certain mixed beverages, spaced sides between the beverage container and the outside of the device, a removable closure for the beverage container capable of containing temperature producing material, a closure for the last mentioned container capable of containing a plurality of drinking cups and a cover for the last mentioned container.

My device, therefore, possesses many valuable features not found combined in previously known devices, all of which will be evident upon a consideration of my specification and its accompanying drawings.

In the accompanying drawings, illustrating one form of the device of my invention, similar parts are designated by similar numerals.

Figure 2 is a side view of the drinking cup container.

Figure 3 is a side view of the unnested drinking cups.

Figure 4 is a side view of the closure for the receptacle closure.

Figure 5 is a side view of the device of Figure 1, partly broken away for purposes of clearness of explanation.

Figure 1:
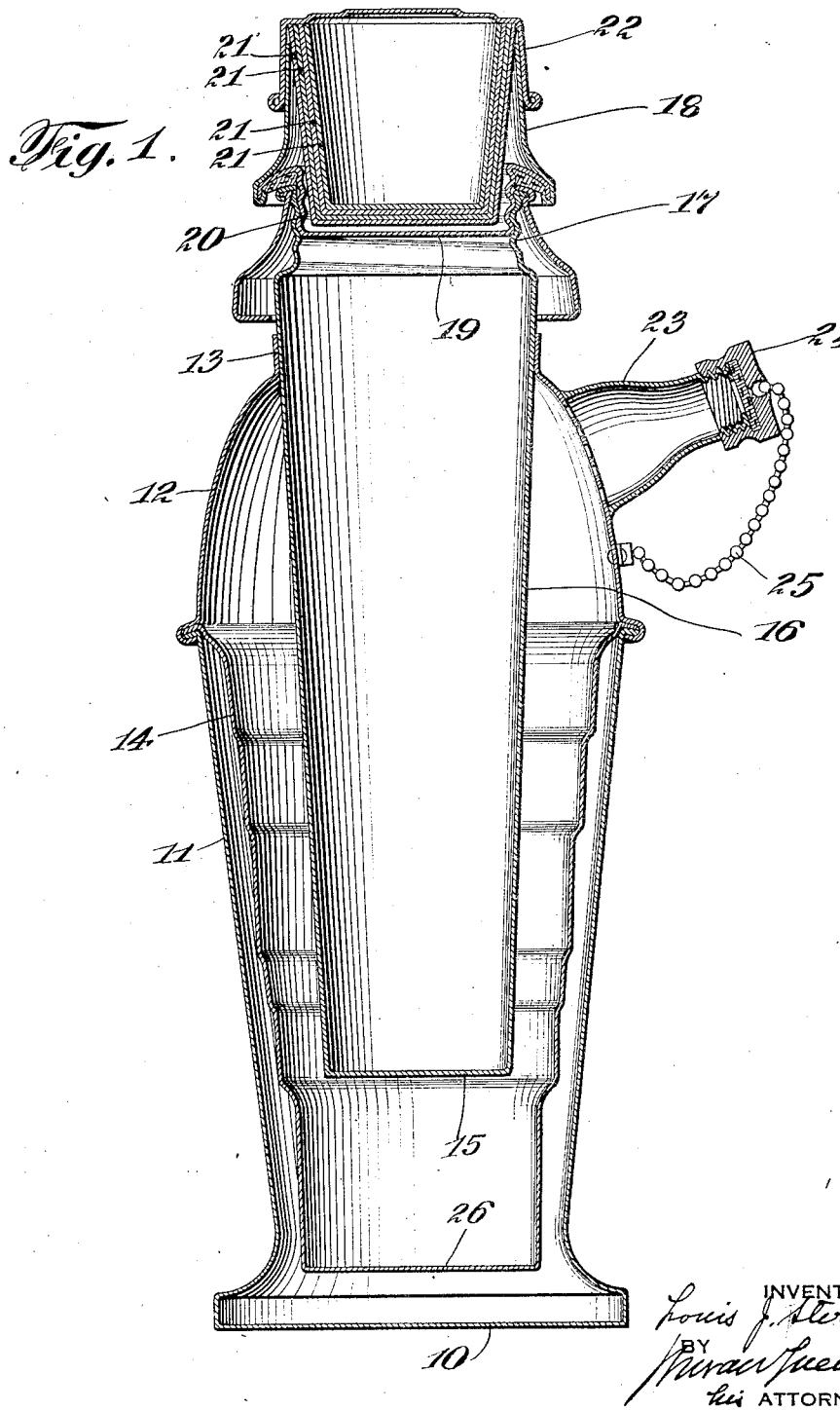
Figure 1 is a central vertical cross-section of one form of my device.

The particular form of the device of my invention, shown in the accompanying drawings, comprises an outside container having an exterior wall having the bottom 10, the side 11, the shoulder 12 and the neck 13. Within the body portion of the outside container is an annular stepped beverage container 14, the space between the wall 11 and bottom 10 of the outside container and the walls of the beverage container acting as a temperature non-conductor. The steps of the side wall of the beverage container are measurements of certain quantities of liquids desired for the combined mixture.

Removably positioned within the neck 13 of the outside container is a receptacle closure having the bottom 15, the side 16 and the internally threaded neck 17.

A closure for the receptacle closure comprises the side 18, the bottom 19 and the exteriorly threaded neck 20, capable of meshment with the neck 17 of the receptacle closure.

Within the closure for the receptacle closure is a plurality of nested cups 21, 21, 21 and a cover 22 abuts upon the outer face of the side 18.

There is thus formed a device having an outside receptacle, the lower portion of which is spaced from a beverage container, a closure in the form of a container for the beverage container, a second closure in the form of a receptacle for the last-mentioned receptacle container, a plurality of drinking cups in the second container and a cover for the second container.

The liquid container has a threaded spout 23 to which is screwed the removable closure 24, the latter being attached to the wall 12 of the liquid container by means of the chain 25.

The operation of the device is as follows:—

The receptacle closure 15, 16, 17 is removed from the neck 17 and the desired beverage is placed within the beverage container formed by the wall 14, the bottom 26 and the wall 12. The closure for the receptacle closure is then removed and the cooling, or heating, materials are placed therein, the closure for the receptacle closure is placed in position and the receptacle closure inserted into the beverage container, thus closing it. The device is then shaken until the temperature of contents of the receptacle closure has been transmitted to the beverage to the desired degree. The cover 22 is then removed and the drinking cups 21, 21 are taken from their receptacle, the cap 24 removed and the beverage poured through the spout 23 into the drinking cups 21, 21.

It is evident that the exterior casing elements 10 and 11 can be omitted and the side 12 be made a part of the wall 14 of the beverage container, thus doing away with the air space between the walls 11 and 14.

It will thus be seen that my invention presents a complete device for heating, or cooling, beverages without actual contact between the beverage and temperature-producing material, combined with a plurality of drinking cups and means for containing them in a portion of the device.

It will be noted, further, that my device is adapted for the employment of temperature-producing materials which might be objectionable if mixed directly with a beverage.

I do not limit myself to the particular size, shape, number, arrangement, or material, of parts, as shown and described, as these are given simply as a means for clearly describing my invention.

What I claim is:—

1. In a container, in combination, a beverage container, a removable receptacle closure for said beverage container, a removable cup container closure for said receptacle closure and a removable cover for said cup container closure.

2. In a container, in combination, an exterior casing, a beverage container within said casing and spaced at least in part therefrom, a removable receptacle closure for said beverage container, a removable cup container closure for said receptacle closure and a removable cover for said cup container closure.

3. In a container, in combination, a beverage container having stepped sides, a removable receptacle closure for said beverage container, a removable cup container closure for said receptacle closure, a removable cover for said cup container closure and a spout to said beverage container.

4. In a container, in combination, an exterior casing, a beverage container having stepped sides within said casing and spaced at least in part therefrom, a removable receptacle closure for said beverage container and extending downwardly therein, a removable cup container closure for said receptacle closure, a removable cover for said cup container closure and a spout to said beverage container.

Signed at New York city, in the county of New York and State of New York, this 6th day of March, 1929.

LOUIS J. STERN.